(12) United States Patent
Pineda Amo (10) Patent No.: US 12,196,179 B2
(45) Date of Patent: Jan. 14, 2025

(54) WIND TURBINE SETPOINT REDUCTION

(71) Applicant: General Electric Renovables Espana, S.L., Barcelona (ES)

(72) Inventor: Isaac Pineda Amo, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 253 days.

(21) Appl. No.: 17/689,273

(22) Filed: Mar. 8, 2022

(65) Prior Publication Data

US 2022/0290650 A1 Sep. 15, 2022

(30) Foreign Application Priority Data

Mar. 9, 2021 (EP) .................................. 21382194

(51) Int. Cl.
  *H02P 9/10* (2006.01)
  *F03D 7/02* (2006.01)
  *H02P 101/15* (2016.01)

(52) U.S. Cl.
  CPC .............. *F03D 7/028* (2013.01); *H02P 9/107* (2013.01); *F05B 2270/1033* (2013.01); *F05B 2270/303* (2013.01); *H02P 2101/15* (2015.01)

(58) Field of Classification Search
  CPC .......... F03D 7/028; F03D 7/045; F03D 17/00; F03D 9/255; F03D 80/00; H02P 9/107; H02P 2101/15; F05B 2270/1033; F05B 2270/303; F05B 2260/84; F05B 2270/3032; F05B 2270/32; F05B 2270/325; F05B 2270/335; F05B 2270/404; Y02E 10/72
  See application file for complete search history.

(56) References Cited

U.S. PATENT DOCUMENTS

| | | |
|---|---|---|
| 8,977,401 B2 | 3/2015 | Poulsen et al. |
| 10,151,301 B2 | 12/2018 | Caponetti et al. |
| 2010/0133831 A1* | 6/2010 | Scholte-Wassink .... F03D 7/043 290/44 |
| 2011/0080001 A1* | 4/2011 | Gundtoft ................. F03D 7/028 290/44 |

(Continued)

OTHER PUBLICATIONS

R. Orozco, S. Sheng and C. Phillips, "Diagnostic Models for Wind Turbine Gearbox Components Using SCADA Time Series Data," 2018 IEEE International Conference on Prognostics and Health Management (ICPHM), Seattle, WA, USA, 2018, pp. 1-9 (Year: 2018).*

(Continued)

*Primary Examiner* — Christopher E. Everett
(74) *Attorney, Agent, or Firm* — Dority & Manning, P.A.

(57) ABSTRACT

The present disclosure relates to methods for determining a maximum power setpoint for a wind turbine comprising: determining an ambient temperature, determining a temperature of one or more wind turbine components and determining a current power output of the wind turbine. The methods further comprise determining the maximum power setpoint based at least partially on a thermodynamic model of the wind turbine components, the ambient temperature, the temperature of the components of the wind turbine and on the present power output of the wind turbine. The present disclosure further relates to methods for determining a setpoint reduction and to wind turbine control systems and wind turbines configured for such methods.

18 Claims, 4 Drawing Sheets

(56) References Cited

U.S. PATENT DOCUMENTS

| | | | |
|---|---|---|---|
| 2014/0244188 A1* | 8/2014 | Bai | F03D 17/00 |
| | | | 702/60 |
| 2015/0240784 A1 | 8/2015 | Sagi et al. | |
| 2015/0322926 A1* | 11/2015 | Caponetti | F03D 13/20 |
| | | | 416/1 |
| 2016/0341179 A1* | 11/2016 | Klodowski | F03D 9/255 |
| 2018/0187648 A1 | 7/2018 | Spruce et al. | |
| 2021/0190041 A1* | 6/2021 | Duarte Pereira | F03D 7/046 |

OTHER PUBLICATIONS

European Search Report Corresponding to EP21382194.5 on Sep. 1, 2021.

\* cited by examiner

WIND TURBINE SETPOINT REDUCTION

The present disclosure relates to wind turbines, in particular to setpoint reduction and methods for determining a maximum power setpoint based on temperatures of wind turbine components.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

In variable speed wind turbines, a wind turbine controller can change control settings of the wind turbine to adapt to varying wind conditions. In particular, pitch angles of the blades and generator torque may be varied to adapt to the wind conditions. At wind speeds below the nominal or "rated" wind speed, the control objective is generally to maximize electrical power output of the wind turbine i.e. pitch and generator torque are varied such that maximum electrical power output can be delivered to the grid. Above the nominal wind speed (and depending on the circumstances around the nominal wind speed), the control objective may be particularly to keep loads under control i.e. pitch and generator torque are varied to reduce the loads on the wind turbine to acceptable levels, while the power output is maintained at the highest possible level (given the constraint on the loads).

Wind turbines may be used in widely different settings: onshore, offshore, in warm climates and cold climates. If the ambient temperature rises, temperature of wind turbine components may also rise. If the ambient temperature is very high or remains high for a prolonged period of time, temperatures of wind turbine components may become too high and the operation of the wind turbine may need to be adapted to keep the temperatures of wind turbine components at acceptable levels.

Two different methods are known for dealing with such a situation. In one known solution, for different ambient temperatures, different maximum power setpoints (i.e. power limits) are defined. Such maximum power setpoints as a function of ambient temperatures may be fixed in contract between wind turbine manufacturers and operators.

In operation, the ambient temperature may be monitored and depending on the ambient temperature, the predefined maximum power setpoint is used. In particular this may mean that, above nominal wind speed, rated power is not delivered to the grid anymore, but rather a reduced amount of power is delivered. The operation of the wind turbine may be normal for lower wind speeds: even if a maximum power setpoint is determined based on ambient temperature, the prevailing wind conditions may be such that this maximum power cannot be reached even in optimum operation. One disadvantage of this approach is that the maximum power setpoint are generally set quite conservatively and this affects electrical power output.

In another known solution, temperatures of wind turbine components are measured during operation, and corresponding threshold values for wind turbine components are predefined. When the temperatures of the wind turbine components stays below the corresponding threshold, then the maximum power setpoint is not affected i.e. nominal rated power can be delivered to the grid if wind conditions are favorable. When one of the temperatures of the wind turbine components reaches a corresponding threshold, the power output is (generally) drastically reduced to cool the wind turbine components. One disadvantage of this approach is that power output, if reduced, generally needs to be reduced rapidly in order to guarantee safe operation of the components. Power output variations can thus be significant. Another disadvantage is that, if operation is based on component temperatures (rather than ambient temperature) wind turbine operators cannot know or reasonably guess in advance how often power setpoint reduction will be necessary throughout the lifetime of the wind turbine, or throughout a year.

SUMMARY

In an aspect of the present disclosure, a method for determining a maximum power setpoint for a wind turbine is provided. The method comprises determining an ambient temperature, determining a temperature of one or more wind turbine components and determining a present power output of the wind turbine. The method further comprises determining the maximum power setpoint based at least partially on a thermodynamic model of the wind turbine components, the ambient temperature, the temperature of the components of the wind turbine and on the present power output of the wind turbine.

In accordance with this aspect, a method for determining a maximum power setpoint is provided which takes into account more than just the ambient temperature. Since also the actual temperature of the component(s) is taken into account, an overly conservative approach is avoided, and operation is not unduly limited even if ambient temperature is (temporarily) high if the wind turbine components can actually continue with normal operation without compromising component safety or performance. A balanced approach is provided taking into account not only the actual current temperature(s), but also a prediction. The method is therefore not only based on a present measurement and a reaction thereto, but also on a modeled behavior of the wind turbine component(s).

In a further aspect, a wind turbine control system for controlling a wind turbine is provided. The control system is configured to determine an ambient temperature, determine a temperature of one or more wind turbine components and determining a present power output of the wind turbine. The control system is further configured to determine the maximum power setpoint based at least partially on a thermal model of the wind turbine components, the ambient temperature, the temperature of the component of the wind turbine and on the present power output of the wind turbine.

In yet a further aspect, a method for determining a setpoint reduction for a wind turbine is provided. The method comprises measuring a first temperature of a first electrical component of the wind turbine and measuring a second temperature of a second electrical component of the wind turbine. The method further comprises determining an ambient temperature. and determining a present power output of the wind turbine. The method also includes determining a future first temperature profile during a first prediction window based on the measured first temperature, the determined ambient temperature and the present power output of the wind turbine and determining a future second temperature profile during a second prediction window based on the measured second temperature, the determined ambient temperature, and the present power output of the wind turbine. A setpoint reduction for the wind turbine is determined if the future first temperature profile reaches a first temperature threshold established for the first electrical component or if the future second temperature profile reaches a second temperature threshold established for the second electrical component.

Throughout the present disclosure, nominal power or "rated power" is to be understood as the maximum power output according to standard operation of the wind turbine i.e. this nominal or rated power may be delivered to the grid at wind speeds at or above the nominal wind speed.

Throughout this disclosure, a maximum power setpoint is to be understood as the maximum power output of a wind turbine independent from prevailing wind conditions i.e. even if wind speeds are high enough such that more electrical power could be delivered to the grid, and particularly that the nominal rated power output could be delivered to the gird, the operation of the wind turbine is limited in such a manner to produce less electrical power than possible.

"Setpoint reduction" is to be understood as a wind turbine operation which is limited to produce and deliver to the grid less than the nominal or rated power. This operational limitation is not due to the prevailing wind conditions, but due to other circumstances. And within the present disclosure particularly, this operational limitation is due to temperatures or thermal limitations including predefined ambient and component temperatures and thermal limitations relating to either the ambient temperature or component temperatures.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
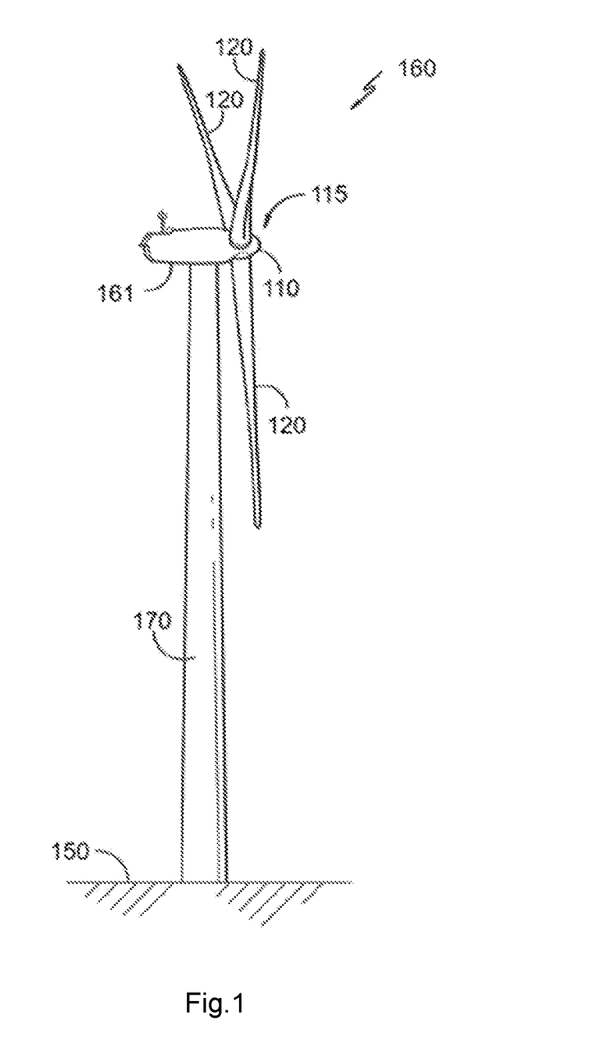
FIG. 1 schematically illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
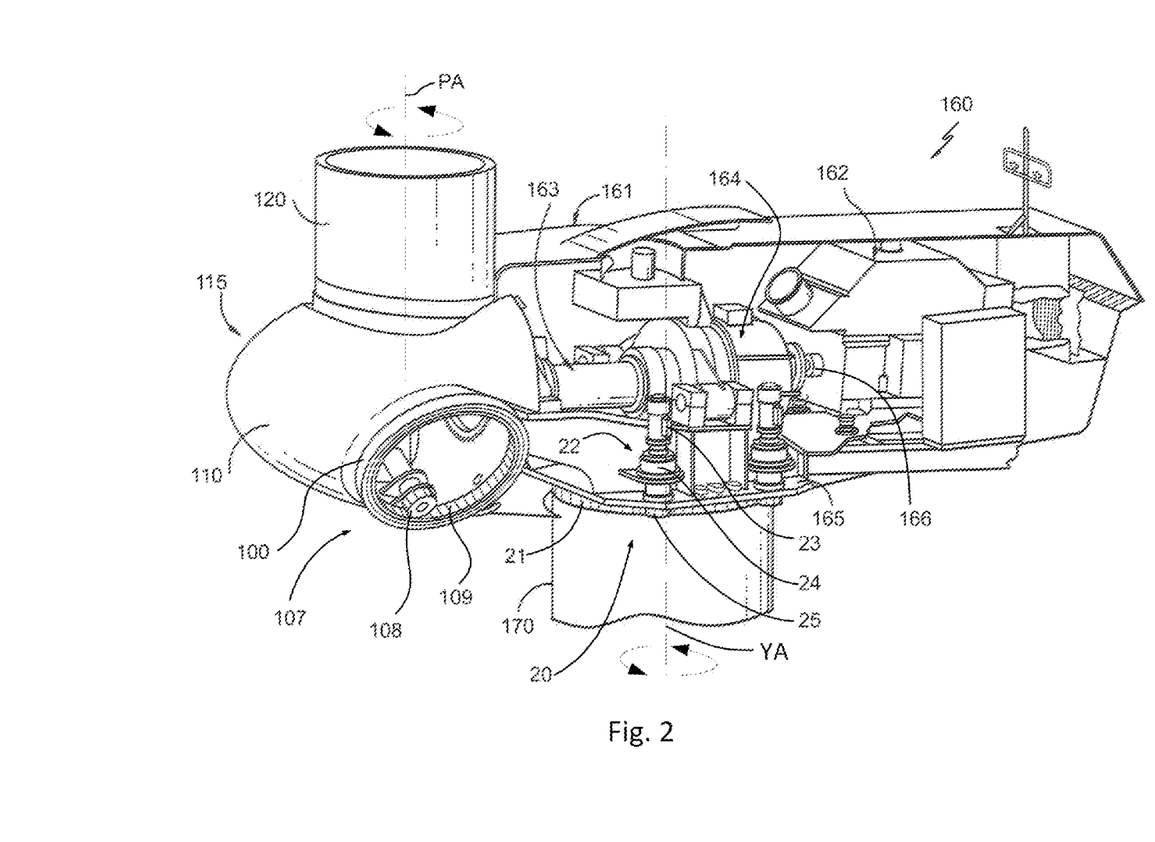
FIG. 2 illustrates a simplified, internal view of one example of the nacelle of the wind turbine of FIG. 1.

FIG. 2 illustrates a simplified, internal view of one example of the nacelle 161 of the wind turbine 160 of FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 may be rotatably coupled to the tower 170 through a yaw system 20 in such a way that the nacelle 161 is able to rotate about a yaw axis YA, or there may be other ways to position the rotor in the desired angle to the wind. If there is a yaw system 20, such system will usually comprise a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

As indicated above, blades 120 are coupled to the hub 110 by a pitch bearing 100 in between the blade 120 and the hub 110. The pitch bearing 100 comprises an inner ring 103 and an outer ring 104. A wind turbine blade may be attached either at the bearing inner ring or at the bearing outer ring, whereas the hub is connected at the other. A blade 120 may perform a relative rotational movement with respect to the hub 110 when a pitch system 107 is actuated. The inner bearing ring may therefore perform a rotational movement with respect to the outer bearing ring in FIG. 2. The pitch system 107 of FIG. 2 comprises a pinion 108 that meshes with an annular gear 109 provided on the inner bearing ring to set the wind turbine blade into rotation around a pitch axis PA.

Figure 3:
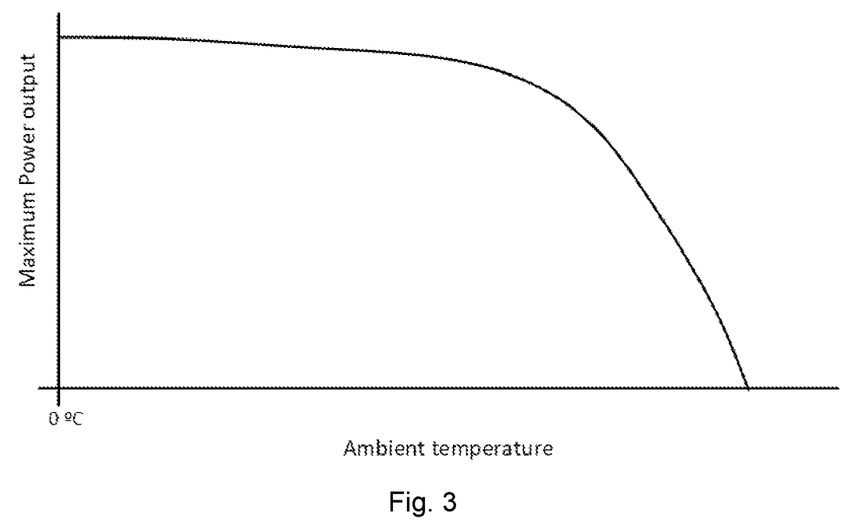
FIG. 3 schematically illustrates an example of a maximum power setpoint curve based on ambient temperatures.

FIG. 3 schematically illustrates an example of a maximum power setpoint curve based on ambient temperatures.

For a variety of ambient temperatures, maximum power outputs are defined. Such a contract may be included in a contract between a wind turbine manufacturer and a wind turbine operator or client.

At relatively low ambient temperatures, the maximum power output may be the nominal power of the wind turbine. At lower ambient temperatures, there is no risk that component temperatures can reach their operational limits and thus no power curtailment is necessary.

At higher ambient temperatures, component temperatures may reach their operational limits, particularly if the wind turbine has been operating at its maximum capacity for while. In order to protect the wind turbine components and ensure safe operation, the power output of the wind turbine may be limited and the maximum power setpoint may be reduced.

However, there is no direct or linear relationship between ambient temperature and component temperatures. Particularly, component temperature may lag behind ambient temperature. Moreover, component temperature does not only depend on the ambient temperature, but also on a thermal history and inertia of the component, which in turn depend on the electrical power production in the recent operation of the wind turbine.

Figure 4:
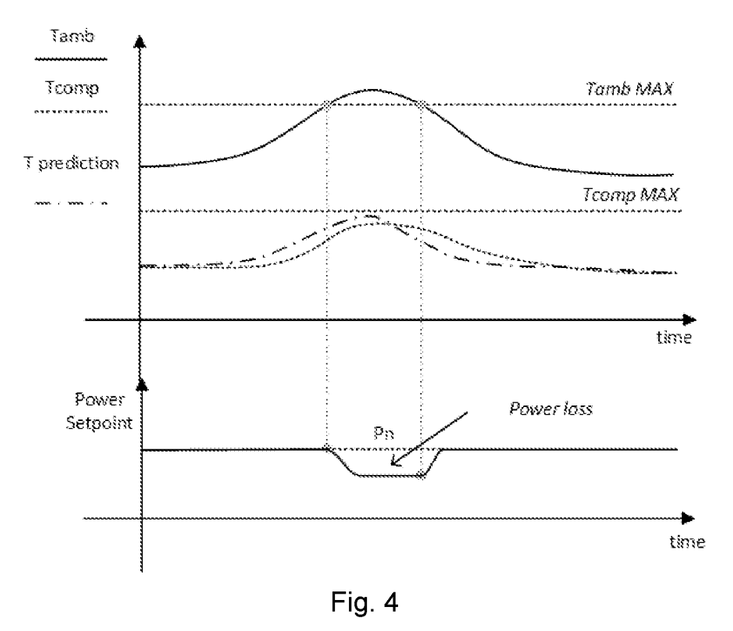
FIG. 4 schematically illustrates an example of how a maximum power setpoint based on ambient temperatures may reduce power output unduly.

FIG. 4 schematically illustrates an example of how a maximum power setpoint based on ambient temperatures may reduce power output unduly. The top part of FIG. 4 schematically illustrates how ambient temperature may vary throughout a day. Based on a curve like the power derating curve illustrated in FIG. 3, the power setpoint may be reduced as soon as the ambient temperatures reaches a predefined (contractual) limitation. The setpoint reduction may remain active until ambient temperature drops sufficiently.

The middle part of FIG. 4 indicates how a component temperature develops. It may be seen that a (safety or operational) temperature limit may not actually be reached for the component even if the ambient temperature is high. As mentioned before, ambient temperature is an important factor indicative of a component temperature, but other factors including e.g. recent power output have an influence as well. If a wind turbine has been inactive for a while, e.g. due to maintenance, the temperature of components may actually be (much) lower than expected.

FIG. 4, middle part, also schematically illustrates how in examples of the present disclosure, an undue limitation of the power setpoint may be avoided. In an aspect of the present disclosure, a method for determining a maximum power setpoint for a wind turbine is provided, which comprises determining an ambient temperature, determining a (present) temperature of one or more wind turbine components and determining a present power output of the wind turbine. Based on the ambient temperature, the temperature of the components of the wind turbine and on the present power output of the wind turbine and on a thermodynamic model of the wind turbine components, a maximum power setpoint may be determined.

Particularly, as illustrated in FIG. 4, a temperature prediction may be made for the wind turbine component. The temperature prediction may be a temperature profile during a prediction window, and/or may include predicting one or more future maximum temperatures of the wind turbine components within a time window. In the example of FIG. 4, it may be seen that in the prediction, the component of the wind turbine does not reach a limit, and therefore that a power setpoint reduction was not necessary even though the ambient temperature reached high levels.

Such methods may be carried out substantially continuously, e.g. every minute, or every 5-30 minutes, temperatures may be determined, and maximum power setpoints may be recalculated. The method may be carried out a constant frequency, or the frequency may be varied. E.g. the frequency of determining, measuring and/or calculating may increase as a temperature closer to a limit temperature is reached.

In some examples, the wind turbine components include one or more of a power converter, a generator and a transformer, or parts of these components. The components that may define operational limits for the wind turbine are generally electrical components. In the generator, the generator stator and the generator rotor may be separately monitored and have individual threshold temperatures.

In some examples, the method may include determining a temperature of a first of the wind turbine components, and determining a temperature of a second of the wind turbine components, determining a first maximum power setpoint based at least partially on the temperature of the first wind turbine component, the ambient temperature and the present power output of the wind turbine. The method may further include determining a second maximum power setpoint based at least partially on the temperature of the second wind turbine component, the ambient temperature and the present power output of the wind turbine and selecting the lower of the first and second maximum power setpoints as maximum power setpoint for the wind turbine. Different components can have different thermal and operational limits. Depending on circumstances, one component (e.g. a transformer) may be close to a thermal limit, whereas another component (e.g. the power converter) is not. Each of the electrical components may thus prescribe different maximum power setpoints. The lowest of the maximum power setpoints may be selected to limit the operation of the wind turbine, In examples, determining the maximum power setpoint may comprise predicting one or more future maximum temperatures of the wind turbine components within a time window. The time window may be between 5 minutes and 4 hours, specifically between 10 minutes and 1 hour.

In some examples, the future maximum temperatures of the wind turbine components may be compared with one or more corresponding predefined temperature thresholds for the wind turbine components. In examples, the methods may further comprise defining a maximum power setpoint for the wind turbine as a rated nominal power output if the future maximum temperature of the wind turbine components is below the corresponding predefined temperature thresholds, and defining a reduced power setpoint for the wind turbine if one or more future maximum temperatures of the wind turbine components are above corresponding predefined temperature thresholds. So, if the predicted future maximum temperatures stay below predefined thresholds (and thus within allowable operational limits), the maximum power setpoint is not affected and stays according to the rated (design) power. Only, when necessary according to the prediction, the maximum power setpoint is affected. Depending on wind conditions, the operation of the wind turbine is then adapted to deliver output power according to the established maximum power setpoint.

Figure 5:
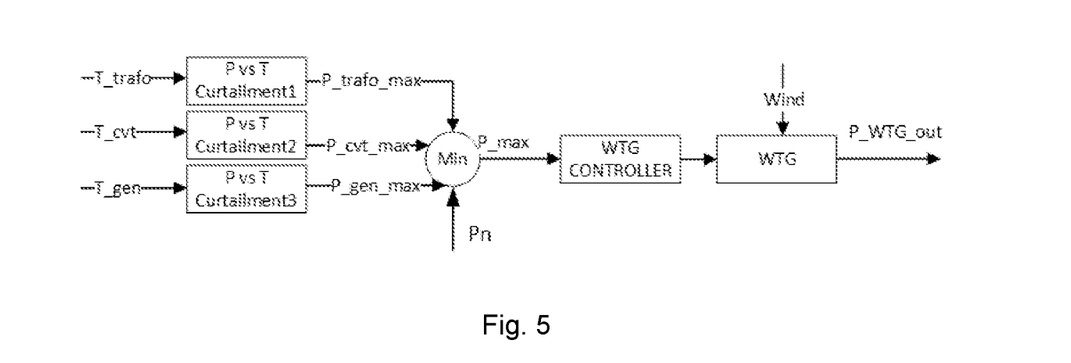
FIGS. 5 and 6 schematically illustrate an example of method of determining a maximum power setpoint.
Figure 6:
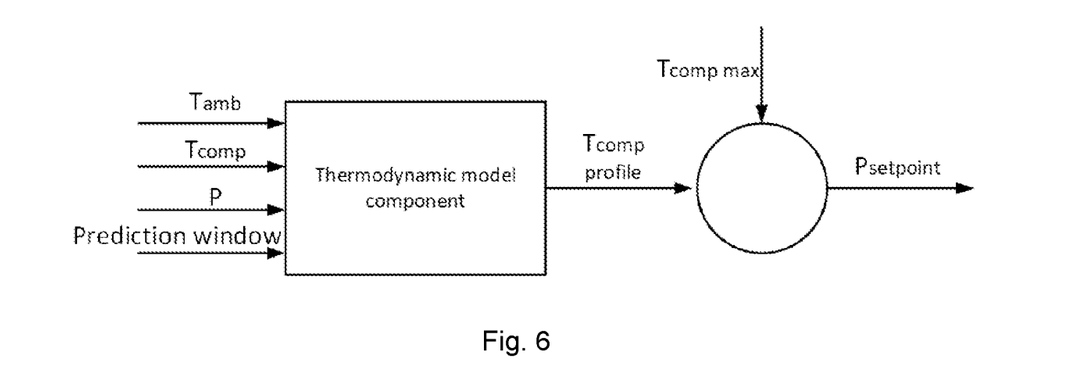

FIGS. 5 and 6 schematically illustrate an example of method of determining a maximum power setpoint. FIGS. 5 and 6 schematically illustrate a method for determining a setpoint reduction for a wind turbine comprising: measuring a first temperature of a first electrical component of the wind turbine and measuring a second temperature of a second electrical component of the wind turbine. The method further comprises determining an ambient temperature and determining a present power output of the wind turbine. Finally, the method further comprises determining a future first temperature profile during a first prediction window based on the measured first temperature, the determined ambient temperature and the present power output of the wind turbine and determining a future second temperature profile during a second prediction window based on the measured second temperature, the determined ambient temperature, and the present power output of the wind turbine. Finally, the method also includes determining a setpoint reduction for the wind turbine if the future first temperature profile reaches a first temperature threshold established for the first electrical component or if the future second temperature profile reaches a second temperature threshold established for the second electrical component.

As illustrates in FIG. 6 determining the future first and second temperature profiles may comprise calculating the first and second temperature profiles based on thermodynamic models of the first and second electrical components. A thermodynamic model of a wind turbine component may include one or more mathematical equations including empirical factors or constants that attempts to describe the thermal behavior of an electrical component. Specific characteristics of the electrical components may be included in the corresponding models. The models may also include constants, factors or parameters that reflect how wind turbine operation influences the operation of the individual wind turbine components.

Input for the thermodynamic model may include the ambient temperature, the temperature of the component itself, the power output of the wind turbine. Further input may be the prediction time window. In examples, further input may be a meteorological prediction, e.g. a prediction of a future ambient temperature profile and/or a prediction of a future wind profile, including one or more of wind direction, wind shear, wind veer, wind direction, turbulence and/or others. In addition to or alternatively hereto, a future wind turbine power production may be used. Such a future wind turbine power production may be based on an estimated or predicted future wind speed.

The thermodynamic model may estimate, calculate or otherwise determine a prediction of development of temperature over time. Output of the thermodynamic model may include a maximum temperature for the component during the prediction time window, i.e. the highest temperature that the component will reach during the prediction time window according based on the input of the module. Output for the thermodynamic module may include a temperature profile for the component during the prediction window including e.g. a variation of the component temperature over time.

Different components may prescribe different setpoint reductions.

As illustrated in FIG. 5, taking into account the different setpoint reductions of different components such as the main wind turbine transformer, the wind turbine generator and the power converters, a wind turbine setpoint reduction may be determined as the most limiting setpoint. In the example of FIG. 5, only if one or more of the setpoint reductions for the individual components is determined to be lower than the nominal power of the wind turbine, an actual setpoint reduction takes place.

As illustrated in FIG. 5, the resulting setpoint reduction may be fed to the wind turbine controller, which controls the operational settings of e.g. pitch system, generator torque. Other operational settings include e.g. the yaw angle. The actual operational settings do not only depend on the setpoint reduction but also on the prevailing wind conditions. In examples, a method may further comprise pitching the blades and/or reducing rotor speed in order to operate according to the setpoint reduction. By pitching the blades and reducing rotor speed, the power output may be reduced.

In some examples, the first and the second prediction windows may be the same. In other examples, different components may have different prediction windows.

In some examples, a method may further comprise predicting an ambient temperature profile during the prediction window and calculating the first and second temperature profiles taking into account the predicted ambient temperature profile. A predicted ambient temperature profile during a prediction window may be used as input for the thermodynamic model. Similarly, predicted wind speeds or corresponding predicted future power output (under normal, non-restricted, operation) may be used as input as well.

In some examples, the method may further comprise measuring a third temperature of a third electrical component of the wind turbine, determining a future third temperature profile during a third prediction window based on the measured third temperature, the determined ambient temperature and the present power output of the wind turbine; and determining a setpoint reduction for the wind turbine if the future first temperature profile reaches a first temperature threshold established for the first electrical component or if the future second temperature profile reaches a second temperature threshold established for the second electrical component or if the future third temperature profile reaches a third temperature threshold established for the third electrical component. The first, second and third electrical components include a power converter, a generator and a main transformer.

In examples, an original power rating may be maintained if the future first, second and third temperature profiles do not reach the first, second and third temperature thresholds respectively.

In a further aspect, a wind turbine control system for controlling a wind turbine configured to carry out any of the examples of the methods described herein. In particular, a wind turbine control system may be configured to determine an ambient temperature, determine a temperature of one or more wind turbine components and determine a present power output of the wind turbine, and further configured to determine the maximum power setpoint based at least partially on a thermal model of the wind turbine components, the ambient temperature, the temperature of the component of the wind turbine and on the present power output of the wind turbine.

In some examples, the wind turbine control system may further be configured to compare the determined maximum power setpoint with a theoretical power output based on current wind conditions, and to operate the wind turbine according to the determined maximum power setpoint, if the determined maximum power setpoint is below the theoretical power output based on the current wind conditions.

In a further aspect, a wind turbine comprising such a control system is provided. Such a wind turbine may comprise one or more sensors to determine the temperature of the wind turbine components. Such a wind turbine may further comprise a sensor or system to determine an ambient temperature. An ambient temperature may also be provided by a met mast or by a neighboring wind turbine.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA), programmable logic controller (PLC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for determining a maximum power setpoint for a wind turbine comprising:
   determining an ambient temperature;
   determining a temperature of one or more wind turbine components;
   determining a present power output of the wind turbine;
   at predetermined intervals, determining the maximum power setpoint based at least partially on a thermodynamic model of the wind turbine components, the ambient temperature, the temperature of the components of the wind turbine, and the present power output of the wind turbine;
   wherein the thermodynamic model provides a predicted maximum temperature of the components during a future time window;
   wherein the maximum power setpoint is determined by comparing the predicted maximum temperature of the wind turbine components with one or more corresponding predefined temperature thresholds for the wind turbine components; and
   at each of the predetermined intervals, reducing the present power output of the wind turbine by a power reduction setpoint in accordance with the maximum power setpoint when the predicted maximum temperature of the components at the interval exceeds the predefined temperature thresholds even though the present temperature of the components at the interval does not exceed the predefined temperature thresholds.

2. The method of claim 1, wherein the wind turbine components include one or more of a power converter, a generator, and a transformer.

3. The method of claim 1, wherein the determining a temperature comprises:
   determining a temperature of a first one of the wind turbine components, and determining a temperature of a second one of the wind turbine components;
   determining a first maximum power setpoint based at least partially on the temperature of the first wind turbine component, the ambient temperature, and the present power output of the wind turbine;
   determining a second maximum power setpoint based at least partially on the temperature of the second wind turbine component, the ambient temperature, and the present power output of the wind turbine; and
   selecting the lower of the first and second maximum power setpoints as the maximum power setpoint for the wind turbine.

4. The method of claim 1, wherein the time window is between 5 minutes and 4 hours.

5. The method of claim 1, further comprising defining the maximum power setpoint for the wind turbine as a rated nominal power output if the predicted maximum temperature of the wind turbine components is below the corresponding predefined temperature thresholds.

6. A wind turbine control system for controlling a wind turbine, the wind turbine control system configured to perform operations comprising:
   determine an ambient temperature;
   determine a temperature of one or more wind turbine components;
   determine a present power output of the wind turbine;
   at predetermined intervals, determine a maximum power setpoint based at least partially on a thermodynamic model of the wind turbine components, the ambient temperature, the temperature of the component of the wind turbine, and the present power output of the wind turbine;
   wherein the thermodynamic model provides a predicted maximum temperature of the components during a future time window;
   wherein the maximum power setpoint is determined by comparing the predicted maximum temperature of the wind turbine components with one or more corresponding predefined temperature thresholds for the wind turbine components; and
   at each of the predetermined intervals, reduce the present power output of the wind turbine by a power reduction setpoint in accordance with the maximum power setpoint when the predicted maximum temperature of the components at the interval exceeds the predefined temperature thresholds even though the present temperature of the components at the interval does not exceed the predefined temperature thresholds.

7. The wind turbine control system of claim 6, further configured to compare the determined maximum power setpoint with a theoretical power output based on current wind conditions, and to operate the wind turbine according to the determined maximum power setpoint when the determined maximum power setpoint is below the theoretical power output based on the current wind conditions.

8. The wind turbine control system of claim 6, wherein the wind turbine components include one or more of an electrical generator, a power converter, and an electric transformer.

9. A wind turbine comprising the wind turbine control system of claim 6.

10. The wind turbine of claim 9, comprising one or more sensors configured to determine the temperature of the wind turbine components.

11. A method for determining a setpoint reduction for a wind turbine, the method comprising:
   measuring a first temperature of a first electrical component of the wind turbine;
   measuring a second temperature of a second electrical component of the wind turbine;
   determining an ambient temperature;
   determining a present power output of the wind turbine;
   at predefined intervals, determining a future first temperature profile during a first prediction window based on the measured first temperature, the determined ambient temperature, and the present power output of the wind turbine;
   at the predefined intervals, determining a future second temperature profile during a second prediction window based on the measured second temperature, the determined ambient temperature, and the present power output of the wind turbine; and
   at each of the predefined intervals, reducing the present power output of the wind turbine by a setpoint reduction when the future first temperature profile reaches a first temperature threshold established for the first electrical component or when the future second temperature profile reaches a second temperature threshold established for the second electrical component even though the present temperatures of the first or second electrical components at the interval do not exceed the predefined temperature thresholds.

12. The method of claim 11, wherein the determining the future first and second temperature profiles comprises calculating the first and second temperature profiles based on thermodynamic models of the first and second electrical components.

13. The method of claim 11, wherein the first and the second prediction windows are the same prediction window.

14. The method of claim 13, further comprising predicting an ambient temperature profile during the same prediction window and calculating the first and second temperature profiles taking into account the predicted ambient temperature profile.

15. The method of claim 11, further comprising:
   measuring a third temperature of a third electrical component of the wind turbine;
   determining a future third temperature profile during a third prediction window based on the measured third temperature, the determined ambient temperature, and the present power output of the wind turbine; and
   determining the setpoint reduction for the wind turbine when the future third temperature profile reaches a third temperature threshold established for the third electrical component.

16. The method of claim 15, wherein the first, second, and third electrical components include a power converter, a generator, and a transformer.

17. The method of claim 15, further comprising maintaining an original power rating when if the future first, second, and third temperature profiles do not reach the first, second, and third temperature thresholds, respectively.

18. The method of claim 11, further comprising pitching blades of the wind turbine or reducing rotor speed in order to operate according to the setpoint reduction.

* * * * *